Jan. 22, 1946.  E. F. RIESING  2,393,505

MOTOR MOUNTING

Original Filed Aug. 3, 1940

Inventor
ELLWOOD F. RIESING

By Ely & Frye
Attorneys

Patented Jan. 22, 1946

2,393,505

UNITED STATES PATENT OFFICE 2,393,505

MOTOR MOUNTING

Ellwood F. Riesing, Pontiac, Mich., assignor to The Firestone Tire & Rubber Company, Akron, Ohio, a corporation of Ohio Application January 15, 1943, Serial No. 472,532, which is a division of application Serial No. 350,505, August 3, 1940, now Patent No. 2,308,962, dated January 19, 1943. Divided and this application September 13, 1944, Serial No. 553,810

2 Claims. (Cl. 248—10)

This invention relates to resilient mountings, especially to rubber motor mountings.

The general object of the present invention is to provide an inexpensive, easily constructed rubber mounting which has desirable supporting characteristics.

Another object of the invention is to provide a motor mounting which has substantially inclosed bodies of rubber therein used to carry a load placed upon the mounting whereby only minimum movement of the respective portions of the mounting is permitted.

Another object is to provide mountings that are readily placed under preload.

Still another object is to provide mountings, the individual parts of which can not be separated by load applied thereto.

The foregoing and other objects of the invention will be manifest from the following specification, which will be described with reference to the accompanying drawing, in which.

This application is a division of my copending application Serial No. 472,532, filed January 15, 1943, which latter application is a division of my application Serial No. 350,505, filed August 3, 1940, said latter applications having been copending. Said application Serial No. 350,505 has issued as Patent No. 2,308,962, dated January 19, 1943.

Figure 1:
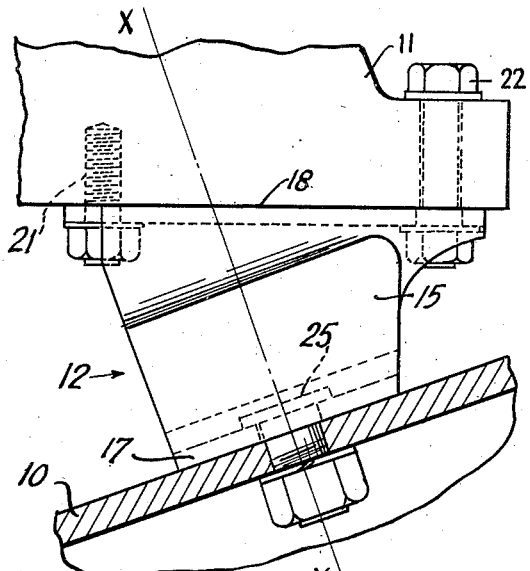
Figure 1 is an elevation illustrating one embodiment of the invention as it is secured to an automobile frame to position a motor thereon.

Referring specifically to the apparatus shown in Figure 1, it comprises an inclined frame member 10 of a vehicle upon which a motor 11 is positioned through a motor mounting 12. Usually two motor mountings 12 are required to position the front end of the motor upon the frame of the vehicle. These motor mountings are positioned on opposite sides of the front end of the motor and inclined downwardly towards the center axis of the motor. Hence, in the position shown, the motor mounting 11 would be on the right side of a motor, when looking at the Figure 1 toward the front end of an automobile.

Figure 2:
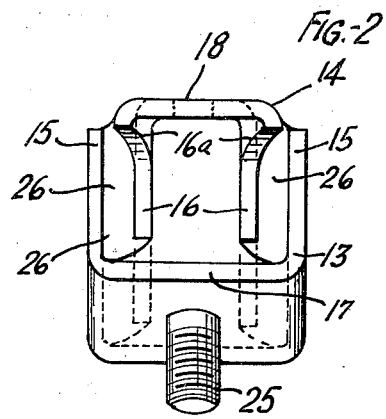
Figure 2 is a right side elevation of the motor mounting shown in Figure 1.

Figure 2 best shows that the mounting 12 mainly comprises a base member 13, which is substantially U-shaped in cross section, and a supporting member 14, that is substantailly inverted U-shape in section. Side arms 15 of the base member 13 are of uniform height throughout, while side arms 16 of the supporting member 14 taper downwardly from the inner ends thereof to the outer ends, as indicated on Figure 1. This permits the supporting member 14, which is appreciably narrower than the base member 13, to be received within the base member 13, and to have its side arms 16 spaced from, but opposed to, the side arms 15. The lower edges of the side arms 16 are parallel to the base 17 of the member 13 and base 18 of the supporting member 14 is substantially horizontal. This base 18 extends beyond the ends of the member 13 and has two holes 19 and 20 formed therein through which a tap screw 21 and a bolt 22, respectively, can be positioned to secure the supporting member 14 to the motor 11. A headed bolt 25 extends downwardly from the base member to facilitate securing same to the frame member 10.

To position the supporting member 14 resiliently upon the base member 13, a substantially rectangular rubber block 26 is placed between the opposed portions of each of the sets of the side arms 15 and 16 and covers substantially the entire surface of the side arms. These rubber blocks 26 are vulcanized to the adjacent opposed portions of the side arms 15 and 16 and form the base member 13 and a supporting member 14 into the integral motor mounting 12. Both the upper and lower surfaces of the rubber blocks 26 are upwardly curved in a direction from the side arms 15 towards the side arms 16. Such upward curvature is particularly important at the lower surfaces of the rubber blocks, which abut the base 14, since that construction functions to retard downward movement of the supporting member relatively of the base member. This action is secured since downward movement of the supporting member brings greater area of the rubber blocks 26 into engagement with the base 17 of the member 13 and places more of the rubber under absolute compression load. Portions 16a of the side arms 16, above the upper end of the member 13, extend beyond the ends of the rubber blocks 26 and are flared outwardly. This aids in retarding relative axial movement between the base and supporting member.

Normally the maximum load applied to the motor mounting 12 is a compression load, since the lower portions of the rubber blocks 26 are substantially confined, and since the normal grain structure of the rubber blocks 26 extends upwardly from the side arms 15 towards the side arms 16. Then load applied to the supporting member 14 moves it downwardly and principally compresses the rubber blocks 26.

The line XX shown on Figure 1 of the drawing is perpendicular to the center plane of the mounting shown in Figure 1 and it extends through the principal axis line of the engine. The principal axis line is the line determined after suspending a motor from its universal ball joint, by then theoretically suspending a plum line from the universal ball joint of the motor. The mounting of Figure 1, when described in another way, may be said to be tangential to a radius swung from the center of the principal axis of the motor in the transverse plane of the front mounting supports for the motor. This positioning of the motor mountings has a stabilizing action on the engine and tends to minimize transverse movements of the engine in a horizontal plane. Mounting the engine in the manner disclosed herein actually brings about movements in the rubber mountings which are radial about the principal axis of the motor.

From the foregoing description it will be seen that an inexpensive, easily constructed motor mounting is provided by the invention. This mounting is adapted to have maximum movement between its component parts in a vertical direction and to have limited movement in all other directions whereby a stable supporting action is secured.

Figure 4:
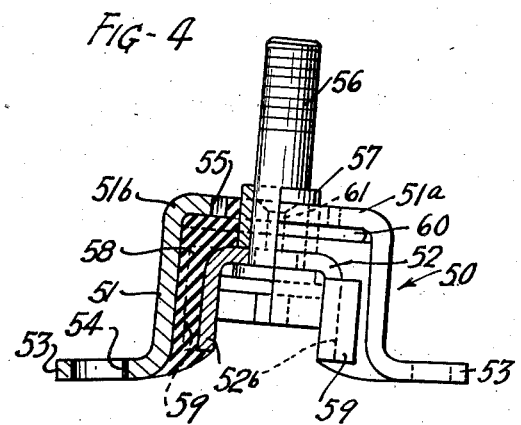
Figure 4 is an elevation, partly in section, of a modification of the invention.
Figure 5:
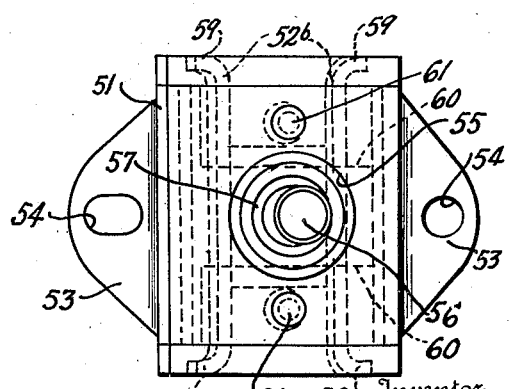
Figure 5 is a plan of the mounting of Figure 4.

Figures 4 and 5 illustrate another form of the invention. In this case, two substantially inverted U-shaped members 51 and 52 are provided with the member 52 being smaller than the member 51 and being received therein. The larger member 51 has outwardly extending flanges 53 formed at its lower ends, which flanges have holes 54 therethrough to aid in securing the mounting 50 to a desired object. In the base or connecting portion 51a of the larger member 51, a relatively large hole 55 is formed. Then a stud bolt 56 which engages with the smaller member 52 extends upwardly therefrom through hole 55 and is adapted to be secured to a member to be supported by the mounting 50. The bolt 56 is welded to the member 52 to retain it in position. A metal spacer sleeve 57 is placed around the bolt 56 to prevent the supported member from bearing upon the supporting member 51.

The inverted U-shaped members 51 and 52 are held together by a rubber block 58 that is positioned between adjacent parallel arms 51b and 52b, respectively, of the members 51 and 52 and which is vulcanized thereto. The rubber block 58 also extends between the adjacent base portions of the members 51 and 52, although it is not vulcanized to the base of the member 51, for a purpose hereinafter to be described. Outwardly struck end flanges 59 are formed on the sides of the arms 52b, which flanges aid in confining the rubber block 58 in position and retarding fore and aft movement in the mounting 50.

Figure 3:
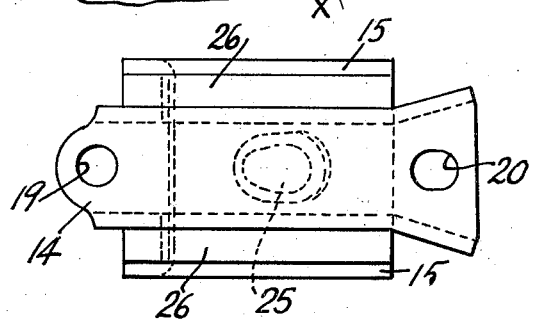
Figure 3 is a plan of the motor mounting of Figure 1.

The motor mounting 50 is completed by inserting rectangular metal bars 60 between the upper surface of the block 58 and the base of the member 51 whereby upward movement, or rebound of the member 52, when load is removed from the bolt 56, is limited and the motor mounting 50 is retained under stressed condition even when no load is applied thereto. Rivets 61 secure the bars 60 to the base 51a, and, obviously, the bars are not positioned in the mounting until the rubber blocks are vulcanized in position in the mounting. The bars are positioned by applying load to the bolt 56 which moves the rubber block 58 downwardly relatively of the base 51a and provides space into which the bars can be slid. The size of the metal bars 60 can be varied whereby the amount of initial stress to which the mounting 50 is subjected can be changed to suit any given load condition. This mounting 50 is adapted to be used between two non-parallel surfaces, as is the mounting shown in Figures 1 through 3 but both mountings can be varied so as to have the bases of the U-shaped members parallel whereby the mounting is adapted to be used between parallel surfaces.

While two embodiments of the invention have been fully illustrated and described herein, it will be apparent that further modifications of the invention may be made without departing from the scope of the invention, as defined in the appended claims.

What is claimed is:

1. A mounting having two relatively movable portions comprising two inverted U-shaped members one of which is appreciably smaller than the other and which is positioned within the larger member with the leg portions of the members being in spaced parallel relation, said larger member having a hole through the base thereof, a stud bolt engaged with said smaller member and extending out through the hole in said larger member, rubber means bonded to the parallel leg portions of said members to secure said members together, said rubber means having an upwardly curved lower surface which progressively is flattened out and is adapted to bear upon a support as load is applied to a mounting, said rubber means being bonded to the base surface of said smaller member and normally extending between the base surfaces of said members, and metal bars positioned between the base of said larger member and said rubber block to prestress the rubber therein.

2. A mounting having two relatively movable portions comprising two inverted U-shaped members one of which is appreciably smaller than the other and which is positioned within the larger member with the leg portions of the members being in spaced parallel relation, rubber means bonded to the parallel leg portions of said members to secure said members together, said rubber means being bonded to the base surface of said smaller member and extending between the base surfaces of said members, and metal bars positioned between the base of said larger member and said rubber block to prestress the rubber therein.

ELLWOOD F. RIESING.